United States Patent
Noble, Jr. et al.

(10) Patent No.: US 8,761,375 B1
(45) Date of Patent: *Jun. 24, 2014

(54) UNPAID BREAK TIME FOR CONTACT CENTER AGENTS

(71) Applicant: Noble Systems Corporation, Atlanta, GA (US)

(72) Inventors: James K. Noble, Jr., Marietta, GA (US); Ruby Amastha Fields, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/056,225

(22) Filed: Oct. 17, 2013

Related U.S. Application Data

(63) Continuation of application No. 13/838,913, filed on Mar. 15, 2013, now Pat. No. 8,594,303.

(51) Int. Cl.
  *H04M 3/00* (2006.01)
  *H04M 5/00* (2006.01)
  *H04M 3/51* (2006.01)
  *H04M 3/523* (2006.01)

(52) U.S. Cl.
  CPC ............ *H04M 3/523* (2013.01); *H04M 3/5175* (2013.01)
  USPC .................. 379/265.04; 379/242; 379/265.03

(58) Field of Classification Search
  USPC ................... 379/265.03, 265.05, 242, 265.04
  See application file for complete search history.

(56) References Cited

U.S. PATENT DOCUMENTS 5,533,103 A * 7/1996 Peavey et al. .................... 379/69
6,795,543 B1 * 9/2004 Cartier et al. .................. 379/219

* cited by examiner

*Primary Examiner* — Thjuan K Addy

(57) ABSTRACT

An agent's request for a break is indicated by a pause request and pause code, where the pause code indicates the reason for the break. In one embodiment, a pause request is analyzed to determine if the agent is allowed to request a break associated with the pause code. The pause code may be further analyzed to determine if it is of an unpaid type, in which case the agent is requesting an unpaid break. If the break is of a paid type, then a threshold timer may be started at the beginning of the break that when expires indicates that any remainder of the break is processed as unpaid time. This can be accomplished by noting an event associated with the threshold timer in an agent work history log or by automatically logging off the agent at the expiry of the timer.

20 Claims, 9 Drawing Sheets

600

| Agent Identifier (602) | Event Number (604) | Event (606) | Time/Date (608) |
|---|---|---|---|
| 0134 | 1 | Log-in | 08:00:32 02/05/2013 |
| | 2 | Pause Type 3 | 09:45:12 02/05/2013 |
| | 3 | Resume | 10:03:12 02/05/2013 |
| | 4 | Pause Type 5 | 10:45:28 02/05/2013 |
| | 5 | Resume | 10:55:44 02/05/2013 |
| | 6 | Pause Type 1 | 12:02:28 02/05/2013 |
| | 7 | Alert | 12:47:28 02/05/2013 |
| | 8 | Threshold | 12:50:28 02/05/2013 |
| | 9 | Resume | 12:55:06 02/05/2013 |
| | 10 | Pause Type 3 | 15:00:05 02/05/2013 |
| | 11 | Resume | 15:14:36 02/05/2013 |
| | 12 | Log-out | 17:00:32 02/05/2013 |
| 058 | 13 | Log-in | 07:59:22 02/05/2013 |
| | ⋮ | ⋮ | ⋮ |

FIG. 6

UNPAID BREAK TIME FOR CONTACT CENTER AGENTS

CROSS REFERENCE TO RELATED APPLICATIONS

This application is a continuation of U.S. patent application Ser. No. 13/838,913, filed on Mar. 15, 2013, entitled "Unpaid Break Time for Contact Center Agents", the contents of which are incorporated by reference for all that it teaches.

BACKGROUND

Agents working in a contact center may handle incoming or outgoing communications, such as voice calls, texts, or web chats with remote parties for a variety of applications. Agents handling these communications are often located in a contact center workplace, such as in a cubicle in the contact center. In other embodiments, agents may work remotely, including from a home office in their residence.

Contact center agents are typically scheduled to work in shifts and each work shift typically includes one or more breaks. Depending on the length of the work shift, the agent may be provided two rest breaks and a lunch break, during which they are not handling communications. There are other instances when an agent is not handling any communications from remote parties. For example, when an agent completes handling a communication, such as a voice call, the agent may be involved in "after call work" activities during which no further communications are offered to the agent. After call work time may include activities associated with resolving or completing the purpose of the call. To the extent that a "break" is defined as being unavailable for handling communications, after call work time can be considered as a break.

Typically, certain types of breaks are scheduled for set times, and agents only have limited control of their scheduled break times. Noncompliance with the scheduled break time frequently is due to the agent failing to begin the break at the scheduled time, or returning from a break later than the scheduled time. An agent taking too long of a break, or too many breaks, results in lower productivity for the contact center.

In some cases, it may be difficult to determine that the agent is engaging in inappropriate break-related behavior. For example, an agent involved in an after call work break may take some additional time for personal activities before making themself ready to accept the next call. Since the agent is typically paid based on the assumption that they will only take the allotted times for breaks, agents taking more break time than allowed are working less than the time they are being paid.

Addressing this issue requires a comprehensive tool that is easy to use and that controls how break requests from agents are processed. Agents abusing a break policy in a contact center should be informed when their performance is in non-compliance and should be informed when they are not being paid for such time. It is with respect to these considerations and others that the disclosure herein is presented.

BRIEF SUMMARY

In general, embodiments of the present invention provide computer program products, methods, systems, apparatus, and computing entities for ensuring that agents in a contact center are not paid for inappropriate breaks. In various embodiments, the agent may initiate the beginning of a break, whether scheduled or otherwise, by requesting a "pause" to the call handler system. In one embodiment, "pausing" an agent initiates a break and ceases offering any further communications between the agent and call handler system, regardless of whether the communication is incoming or outgoing, until the agent "resumes." The agent may indicate a pause code along with the pause request, where the pause code indicates a reason for the break.

In one embodiment, the agent may request a pause code that indicates an unpaid break. This is time that is not included as paid work time. This can be done by excluding this time from the agent's total work time, which is then used as the basis for calculating the agent's wages. In another embodiment, the agent may request a pause code that is of a paid type. This time is included as paid time, but within limits.

In one embodiment, the paid pause code may be variously analyzed to determine if the agent can invoke the pause code, e.g., take a break of the type indicated. In various embodiments, restrictions can be defined to limit the types of breaks that may be allowed for a given agent. If the pause code is allowed, then an alert timer may be started when the break begins. The expiry of the alert timer may initiate a message providing notification or a warning that the agent is taking too long of a break. This message may be sent to the agent, a supervisor, or provided to a dashboard application. A second timer, the threshold timer, may also be started when the break begins. In certain embodiments, this is set longer than the alert timer. When the threshold timer expires, this signifies that the remainder of the break, i.e., the time until the agent ends the break, is unpaid time.

The demarcation of the point when a break changes from paid time to unpaid time may be accomplished in various ways. In a first embodiment, an event notation is made in an agent's work history log indicating the threshold timer expired. When the agent requests to "resume" work, thereby ending the break, a resume event is recorded in the agent's work history log. The duration of the time between this threshold event and the resume event may be processed as unpaid time by subsequent systems, including, but not limited to, payroll processing systems.

In a second embodiment, the agent is logged off from the call handler system once the threshold timer expires. This event is also recorded in the agent's work history log. In this embodiment, the agent is not paid for time when the agent is logged off. Thus, once the agent desires to resume handling calls, the agent will have to log back into the call handler system. At that point, the agent will be considered as working and will be paid for their time after logging into the call handler system.

As is discussed in greater detail below, the subject matter disclosed herein may be implemented as a computer-controlled apparatus, a method, a computing system, or as an article of manufacture such as a tangible computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIG. 6 shows one embodiment of an agent work history log data structure in accordance with various embodiments of the invention.

DETAILED DESCRIPTION

Figure 1:
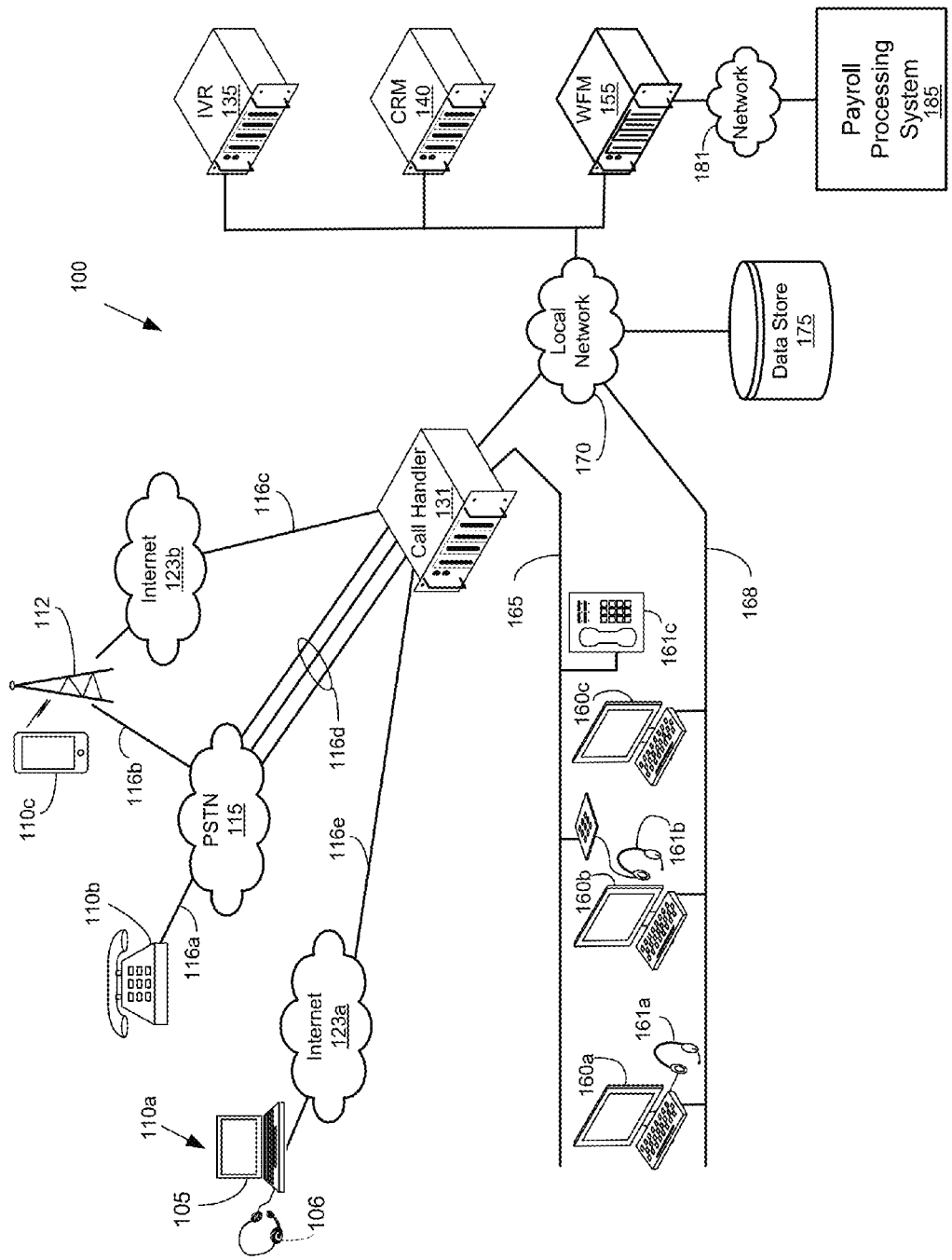
FIG. 1 shows one embodiment of a contact center architecture that may be used to practice the various concepts and technologies as disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Embodiments of the invention may be utilized in various industries, as will become apparent to those of ordinary skill in the art as they read the disclosure. For instance, embodiments of the invention may be used for ensuring factory workers taking breaks are not paid for inappropriate break time. However, for purposes of this disclosure, applications involving contact centers are mainly used for illustrating various embodiments of the invention.

Exemplary Contact Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from or placed to the party. The term "caller," if used, will generally refer to a party communicating with the contact center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, inbound calls from callers to the contact center may be received at a call handler 131, which could be, e.g., an automatic call distributor ("ACD"). In particular embodiments, the call handler 131 may be a specialized switch for receiving and routing inbound calls under various conditions. The call handler 131 may route an incoming call over contact center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 131.

In various embodiments, calls may be routed over facilities 165 to an agent for servicing. That is, for example, the party may speak with an agent to receive customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability.

In various embodiments, the call handler 131 may place an incoming call in a queue if there are no suitable agents available, and/or it may route the call to an interactive voice response system ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. In other configurations, the IVR 135 may be used to only provide announcements.

Depending on the embodiment, the interaction between the call handler 131, IVR 135, agent computers 160a-160c, as well as other components, may involve using a local area network ("LAN") 170. In particular embodiments, when an agent is interacting with a called or calling party, the agent may use his computer 160a-160c to further interact with other enterprise computing systems, such as, for example, a customer relationship management ("CRM") server 140 using facilities 168. A CRM 140 may be used to integrate information from various enterprise business systems to facilitate the agent servicing the call. The agent can also transfer the call to another agent or supervisor, if required.

In addition to receiving inbound communications, including, for example, voice calls, emails, text messages, and facsimiles, the contact center may also originate communications to a called party, referred to herein as "outbound" communications.

In some embodiments, a call handler 131 may comprise a dialer, such as a predictive dialer, to originate outbound calls at a rate designed to meet various criteria. In various embodiments, the call handler 131 is typically configured to dial a list of telephone numbers to initiate outbound calls. Data for the calls may be stored in a data store 175. After the calls are originated, a transfer operation may connect the call with an agent or a queue, or in some instances the IVR 135.

Finally, the contact center architecture 100 may include incorporate a workforce manager ("WFM") 155 component. The WFM maintains information to generate agent's schedules to effectively handle inbound/outbound calls. The agent's schedules may include scheduled break times. The WFM 155 may also maintain a log of historical agent activities, such as when any particular agent logged-in, logged-out, requested a break, and returned from a break. This information may be updated for each shift or at the end of each day. Typically, the WFM receives this information for each individual agent from the corresponding agent's computer 160, and then collates the data into an aggregate agent work history log that encompasses all the agents in the contact center.

The WFM 155 may generate payroll information using the agent work history log. More likely, the WFM 155 transfers one or more work history logs via a network 181 to a payroll processing system 185. The payroll processing system processes the agent work history log to generate payroll for the agents. In one embodiment, the time when the agent is logged-in to the call handler system is the time for which the agent is paid. Thus, when the agent is logged-off, it is presumed that the agent is not working and is not paid.

In one embodiment, the payroll processing system may be a separate service provider from the contact center. The payroll processing system may operate a service that receives work time data (e.g., time sheets) indicating when the agent was logged into the call handling system and computes payroll for the agents. In other embodiments, the functionality provided by the payroll processing system may be implemented by the contact center, including by integrating it into the WFM in certain embodiments. Other variations are possible, as well.

Although a number of the above entities may be referred to as a "component," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Service Overview

Agents in a contact center are typically scheduled to work for certain times on specified days. Quite often, the work schedule is developed for an upcoming period, e.g., an upcoming week or two. From the agent's perspective, the time allocated for each day can be referred to as their "work shift" or simply "shift." The agent's work shift may be a full day, e.g., seven or eight hours. In other instances, the agent's work shift may be a partial day, e.g., a half-day comprising four or five hours. The exact times are based on the agent's willingness to work longer/shorter hours and the needs of the contact center. Typically, various contact center policies and/or employment regulations require that the agent has available, or takes, breaks at certain times.

The nature of these breaks can vary. One frequent type of break is termed herein a "rest break," also referred to as a "break." For a full-day work shift, there may be a rest break in the first half of the shift and another rest break during the second half. Another common break is a lunch break, which typically is longer in duration than a rest break and occurs mid-way through a full-day shift. Typically, a lunch break is not provided on a half-day shift.

Figures 2, 3:
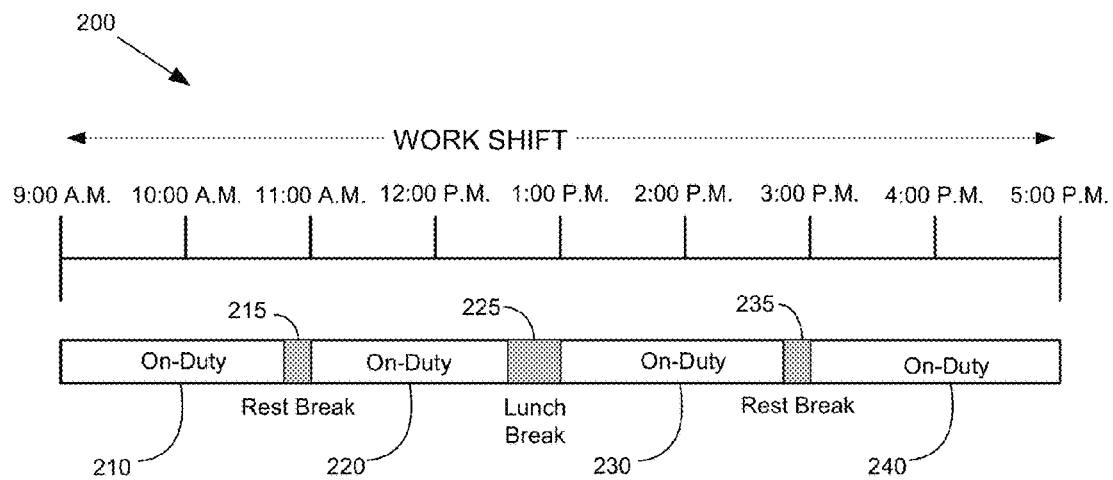
FIG. 2 illustrates one embodiment of a work schedule comprising breaks in accordance with various embodiments of the present invention.
FIG. 3 illustrates one embodiment of a data structure indicating breaks for an agent in a contact center in accordance with various embodiments of the present invention.

These concepts are illustrated in FIG. 2, which shows an exemplary work shift 200 comprising a full day of an agent. The shift 200 begins at 9:00 a.m. and completes at 5:00 p.m. During this time, there are several times when the agent is "on-duty," e.g., available for handling communications. This includes a time segment 210 between 9:00 a.m. to 10:45 a.m.; a time segment 220 between 11:00 a.m. to 12:30 p.m., a time segment 230 between 1:00 p.m. to 2:45 p.m., and a time segment 240 between 3:00 p.m. to 5:00 p.m. Also shown are rest breaks 215 and 235 for fifteen minutes starting at 10:45 a.m. and 2:45 p.m. A lunch break 225 is shown beginning at 12:30 p.m. and continuing to 1:00 p.m.

The "on-duty" time 210, 220, 230, 240 means that the agent is available for handling communications, not that the agent is necessarily actually handling a communication. In many instances, the agent may be waiting for a call to occur. In other instances, the agent may have completed handling a communication with a customer and may be performing various activities to "wrap-up" the matter. This is called "after call work" ("ACW") time.

This particular example of a work shift 200 includes various breaks scheduled at certain times. The contact center may have a number of agents and the scheduling of these breaks is typically staggered. It would be undesirable for all agents to take their lunch break at the same time, as it may result in an insufficient number of agents available to handle calls. Thus, some agents may start a first break at 10:45 a.m. and others may start at 10:30 a.m. This ensures, e.g., that sufficient numbers of agents are available to handle calls at all times.

Although FIG. 2 only identifies rest breaks and lunch breaks for the agent, there are other forms of breaks that may be allowed in a contact center and each contact center may define the types of breaks that employees may request. These may be categorized differently so that the type of break can be tracked, analyzed, and reported to management. For example, contact centers may define a "smoking break," which allows employees who are smokers to leave their work position to go to a designated smoking area. Other types of breaks may be "bathroom" breaks or so-called "health-breaks." These may be taken as needed, and may be shorter than a rest break. Other breaks may be defined for "emergency" reasons, training purposes, coaching, etc. These breaks may be personal in nature or business oriented.

Each of these breaks denotes times when the agent is unavailable to handle contact center communications. Given this definition of a break, there are other times when an agent is not available to handle calls that can also be classified as a break. For example, a "training break" can be a time when the employee is being trained on, e.g., new calling campaign details. In this instance the employee is not free to do whatever they please (as they may be allowed to do on their lunch break) but nonetheless they are unavailable to handle calls. There are other forms of breaks that may exist where the agent is involved in work activities, although not directly handling calls.

One form of break mentioned where the agent is working, but is not available to handle calls is ACW time. Frequently, this is not referred to as a "break" per se, but it is time when the agent is unavailable to handle calls. ACW refers to activities performed by an agent after completing communication with a party. For example, a caller may call the contact center seeking to exchange an item previously purchased because the retailer shipped the wrong item. The agent handling the call may require time after the call is completed to arrange for sending a return postage paid box to the party, shipping a new item at no shipping cost, updating records, etc. Depending on the circumstances, this may take a few minutes or more. In other contact centers, ACW may involve the agent researching a technical problem, and could average an hour or more.

Some breaks may be initiated and/or terminated by the agent. For example, an agent may initiate a smoking break when the need arises. Presumably, after completing the cigarette, the agent returns and indicates the end of the smoking break. In other instances, the agent may be more limited as to when the break may begin. For example, an agent's rest break is typically schedule to begin and end at scheduled times. In some embodiments, systems can be configured to automatically cease call handling operations for an agent in anticipation of the agent beginning a scheduled break, but once the agent leaves, the agent may not return at the appropriate time.

Thus, these systems may not be configured to automatically resume offering calls to the agent, since the agent may not be at their position.

In other instances, such as ACW breaks, the break typically begins once the call ends. In some cases, the ACW time can automatically begin after a call is completed, anticipating that the call will likely involve some ACW time. However, typically only the agent knows when the necessary tasks are completed with respect to ACW time. Thus, in many instances, it is not feasible to automatically end the ACW break after a pre-determinate amount of time. In summary, it is typically the agent that controls the end of the ACW break. This is because if the agent is not ready to handle calls, callers routed to the agent will likely encounter "dead-air."

A common risk is that an agent may take a break, but not return back in time. For instance, if the agent takes an unscheduled break, such as a smoking break, the agent may not return back in a timely manner. In the case of ACW time, the agent may linger and perform other (non-work related) tasks at their computer before returning to being available to handle communications. This means the agent may be paid for working when they are not.

Typically the agent is required to request a break at their workstation computer and when the break is completed, are required to indicate the end of the break. Further, an agent typically indicates the type of break that is being taken. This allows tracking of the number and types of breaks taken, and allows statistics to be developed regarding the duration of the breaks, and how well an agent adheres to scheduled breaks.

In various embodiments, information about scheduled breaks and other breaks an agent may request may be defined in a data structure, which can be stored or processed by various contact center components, including the WFM 155 or the computer workstation 160. One example of a very simple data structure is shown in FIG. 3. In this embodiment, the data structure is a table 300 that comprises columns indicating a break type 310, a start time 315, an end time 320, and a break duration or length 325. In this embodiment, the first row entry 335 indicates a smoking break. Since this is not a scheduled break, it has no scheduled start or end times, but it is indicated to have a maximum length of 10 minutes. The next entry 340 is a rest break, which begins at 10:45 a.m., ends at 11:00 a.m., and lasts for 15 minutes. There is a similar entry 345 for another rest break scheduled for the afternoon. Finally, there is an entry 345 for a lunch break, which begins at 12:30 p.m. and ends at 1:00 p.m.

In other embodiments, more or less information may be maintained about the breaks. For example, a maximum number of smoking breaks during a day or shift may be indicated. Other information may indicate other aspects of breaks that are allowed for certain agents or the average expected duration of non-scheduled breaks. Depending on the embodiment, a variety of information about limitations or expectations regarding the breaks may be indicated in the table 300.

Agents typically request the beginning of a break by invoking a "pause" function at their workstation. This typically results in sending a pause message to the call handler system ("CHS") to instruct it to cease offering further communications to the agent. Invoking the pause function typically allows any existing communications with the agent to be maintained. However, pausing an agent does not log-out the agent. For example, an agent can be involved in a call and invoke the pause command to prevent any further calls being offered to the agent after the agent completes the call and further complete the ACW activities. In addition, in particular embodiments, the pause may function to cease routing other forms of communications to the agent such as, for instance, texts, web chats, emails, etc.

In certain embodiments, the contact center can automatically invoke the pause command on behalf of the agent. This may occur after completing a call or when a scheduled break arrives. However, automatically invoking a pause may not be feasible for unscheduled breaks (e.g., a bathroom break). Thus, an agent typically must at least manually enter a pause command for an unscheduled break. When the agent completes their break, they can enter a "resume" command to indicate the break is over. In many instances, it is not feasible for the contact center to automatically invoke the resume command for scheduled breaks, since if the agent is not present or not ready to resume handling calls, any calls directed to that position will not be handled properly.

In various embodiments, when an agent enters a pause command, a "pause code" is indicated that informs the contact center (including the CHS) of the purpose or nature of the break. For instance, depending on the embodiment, a pause code may be inherent in the type of pause message sent or may be a parameter in the pause message sent. Accordingly, as a result of receiving a pause code, the contact center knows the type of pause requested and why the agent is unavailable to handle further calls. However, in some instances, agents may find ways to game the rules with respect to taking breaks. For example, agents may take a greater number of unscheduled breaks, or take longer breaks than appropriate. In some circumstances, longer breaks are necessary. For example, some ACW instances may involve resolving complex issues that take a significant amount of time, as compared to answering a simple question from a caller, which may involve little, if any, ACW time. Therefore, while an average ACW time may be known, it may not always be clear why a given pause did or did not conform to the average ACW time. Using a pause code informs the CHS of the nature of the break, and allows application of statistics to determine the average duration of that type of break.

In many instances, a pause for implementing a break is generally viewed as superior to approaches that are based on logging in and logging out the agent. First, the pause/resume process may be easier and quicker for the agent as opposed to logging in and logging out. Second, the CHS typically performs various functions when an agent logs-in or logs-out. For example, the CHS may load and process various agent-specific information and update various databases and systems each time an agent logs-in. Similarly, when the agent logs-out, cached information may be stored and other systems may be updated. Thus, using a log-in/log-out approach for taking a break is typically not preferred as it unnecessarily increases processing in the contact center. Further, it may significantly complicate analysis of the breaks, since in many instances a log-out for a break appears to be the same as a log-out at the end of a shift. Thus, a log-out by itself without any indication of why it occurred cannot be analyzed to ascertain the reason for the log-out nor allow easy prediction of its expected duration. Typically, in many contact center implementations, after an agent logs-out, the agent is not considered as working (i.e., they are "off-the-clock"). Thus, while logging an agent off may result in the agent being unpaid, it does not by itself reflect why the agent is not working.

In particular embodiments, mechanisms may be defined for measuring and reporting how many and what type of breaks an agent has taken and comparing that to past agent behavior and/or comparing the duration with other agents. This may include sending notifications to supervisors or highlighting on a dashboard indicator that an agent has taken more than the expected time for a break. However, such mechanisms do not necessarily resolve the concern of contact center operators in that an agent is being paid to handle calls when they are not available to do so. That is, such mechanisms do not resolve the issue of an agent being paid for time that is not being worked.

Figure 4A:
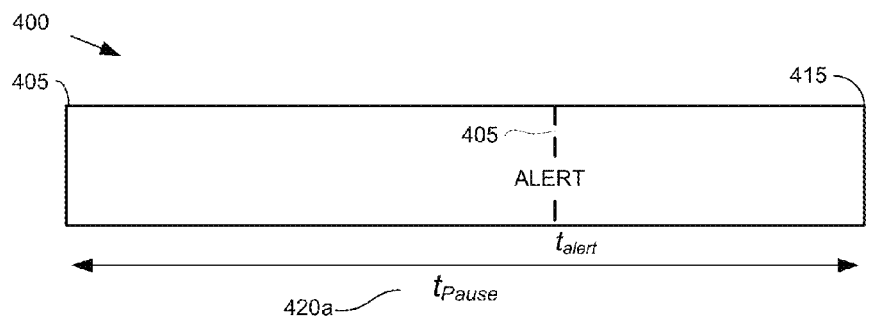
FIGS. 4A-4D illustrate various concepts associated with paid and unpaid breaks in accordance with various embodiments of the present invention.

Potential solutions to this problem are illustrated using the diagrams shown in FIGS. 4A to 4D. Turning first to FIG. 4A, the break 400 illustrates a pause time period similar to one of the breaks shown in FIG. 2. In this instance, the break begins at the beginning point 405 and ends at the end point 415. The duration of the break is referred to as $t_{pause}$ 420a. This break 400 may be considered a paid break in that it is considered as part of the normally included breaks in a shift.

In some embodiments, an alert message may be initiated at time $t_{alert}$ 405. The alert message may be sent to the agent, supervisor, or both and may inform the recipient that the agent has been taking too long of a break. This may, in effect, function as a warning message. For unscheduled breaks, the time $t_{alert}$ 405 may define an average break duration as measured by past values across an agent population for that type of break. For example, a smoking break may have $t_{alert}$ set to 10 minutes. An ACW break may have time $t_{alert}$ 405 defined based on the average duration for agents working on the same shift, or in the same campaign. In other instances, the $t_{alert}$ 405 may define the scheduled break duration. For example, a lunch break or rest break may define $t_{alert}$ as the break duration or as a set time before the end of the break (e.g., a two-minute warning). The value of $t_{alert}$ 405 may be defined different for different campaigns or types of calls. Since the entire pause period may be treated as paid working time for many of the types of breaks, some other form of incentive is needed to motivate the agent to return from a break in a timely manner.

In a variation of the break 400 shown in FIG. 4A, the pause request could be instead for an unpaid break. In this case, there may not be any alert message or $t_{alert}$ 405 defined in conjunction with the break. An unpaid pause code could be defined which allows the agent to indefinitely take a break. Since the agent is not being paid, there is no need to warn the agent of an unnecessarily long break via the alert message. No doubt agents would prefer to avoid using this type of break, since the entire break time is typically excluded from reported work time. However, in certain circumstances this may be the most appropriate pause code for an agent to use.

Transitioning to Unpaid Break Time

Figure 4B:
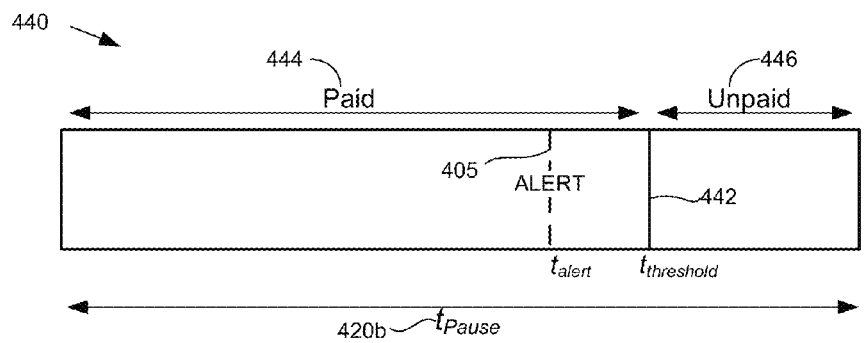

One embodiment for providing the necessary incentive to have agents terminate a break is shown in FIG. 4B. In this embodiment, the break 440 is divided into two portions: a paid portion 444 and an unpaid portion 446. The break 440 still comprises the same duration of $t_{pause}$ 420b, and the alert time $t_{alert}$ 405 may be defined to occur at the same time. However, after a certain time after the alert, another time, $t_{threshold}$ 442, defines a threshold time. The $t_{threshold}$ 442 value indicates the beginning of the unpaid portion 446 of the break 440. This can be defined to have different values based on the campaign, agent, or other criteria. In a typical application, the agent may take a break and receive at warning that too much time has been taken for the break. Once $t_{threshold}$ 442 has been reached, then the remaining portion of the break will be converted to unpaid time. In various embodiments, the agent may or may not receive an indication of when the unpaid portion begins. In various embodiments, the $t_{threshold}$ 442 may be determined by a set time from the beginning of the pause or a set time from when $t_{alert}$ 405 occurs.

Figure 4C:
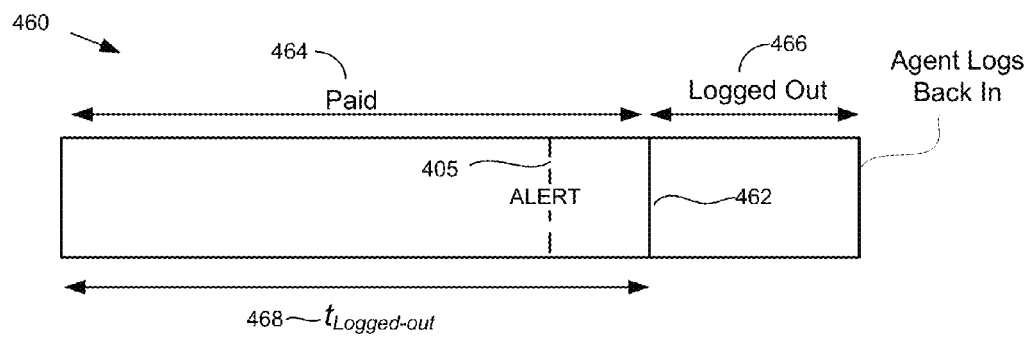

An alternative embodiment is shown in FIG. 4C. In this embodiment, rather than divide the break time into paid and unpaid portions, the break 460 is divided in a paid portion 464 and a logged-out portion 466 as separated by point 462, which occurs at the expiry of $t_{logged-out}$ 468. After this point 462, the agent is automatically logged out from their workstation, and to resume, the agent must log back in. This embodiment may be better suited for some contact center implementations where logged-out time is automatically considered as unpaid time. Thus, this implementation may result in fewer modifications to other systems that process the work data to generate the agent's paycheck. In this embodiment, an alert message 405 may still be used to provide a warning indication to the agent or supervisor. In this embodiment, the agent has taken a break for a total time of the paused portion (i.e., $t_{logged-out}$ 468) and the logged-out portion 466. However, the paused portion is recorded as only being of duration $t_{logged-out}$ 468. Thus, in this embodiment, the agent's pause time is recorded as being shorter in duration compared to FIG. 4B even though the total break time is essentially the same. This is because the portion of time occurring after $t_{logged-out}$ 468 is treated as being logged out and technically would not be considered as a paused break. In some embodiments, in order to distinguish this situation where the agent is logged out automatically from an agent logging out manually, the logged out indication could identify whether it was agent initiated or system initiated. If system initiated, then a reason for the log-out occurring can be recorded in conjunction with the break preceding the log-out.

In various embodiments, information regarding when a break began, when it ended, and any timers that may have occurred during the break are recorded in an agent's work history log. The work history log (or simply work log) contains times and events associated with the agent's shift that allows a reconstruction of the agent's work schedule and related activities. In particular embodiments, the work history log records information associated with pauses occurring during an agent's shift, including those described above in conjunction with FIGS. 4A-4C. Further structure of the work history log is presented below.

State Diagram

Figure 4D:
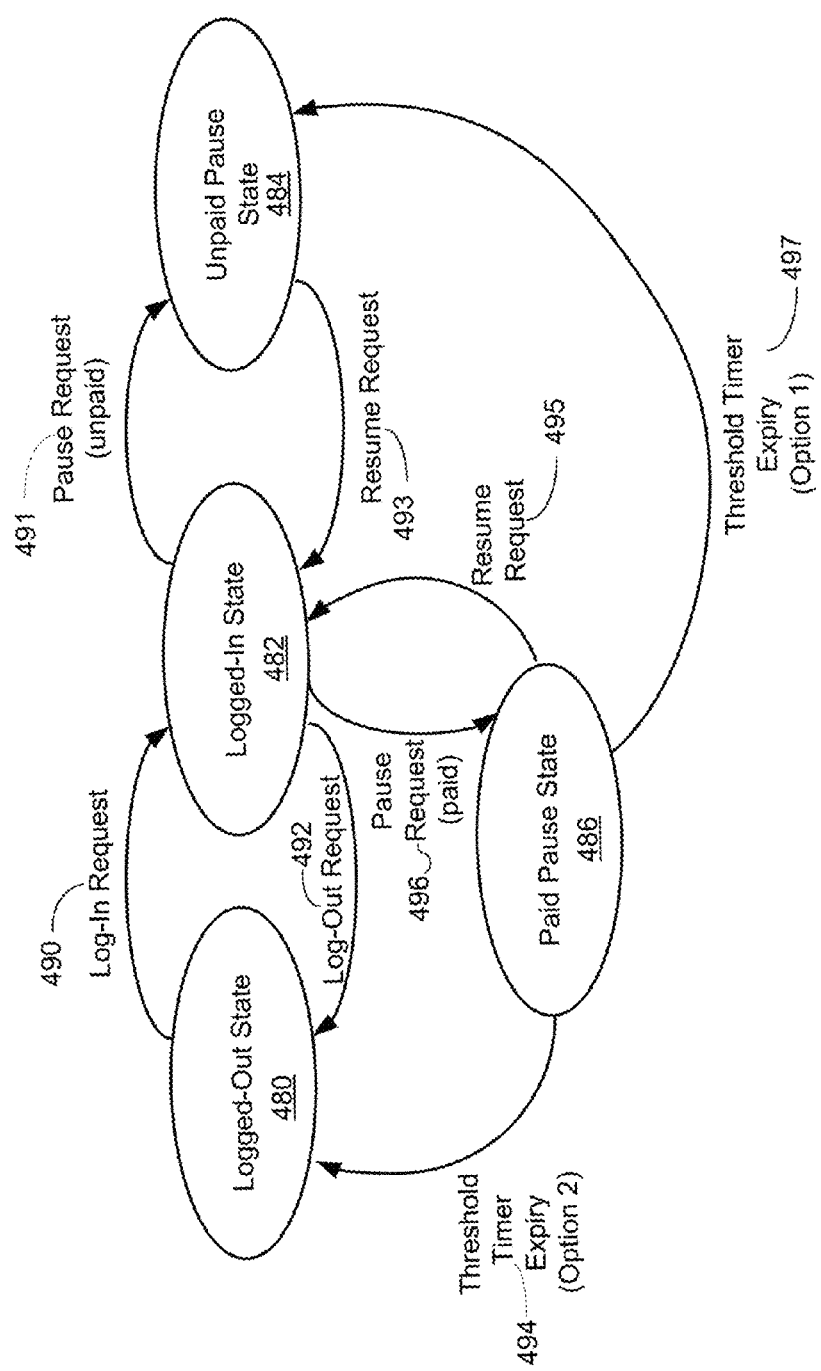

Various concepts regarding the types of breaks and pause requests are shown in FIG. 4D. FIG. 4D is a state diagram that shows various states that can be defined for the agent's status and workstation according to various embodiments.

The initial state is the logged-out state 480. This state is entered when the agent powers up their workstation and an application program executed by the operating system requests the agent to enter their log-in credentials. At this point, the agent is not queued for receiving calls or other forms of communication. The agent's credentials comprise log-in information that corresponds to the log-in request input 490. At this point, a number of actions occur. For example, the agent's profile is identified and loaded, a check is made as to whether the agent is scheduled, various other campaign related information may be loaded as necessary, etc. Once all these housekeeping tasks are completed, the agent is then ready to receive calls once the logged-in state 482 is entered.

Assume the agent does handle a call in the logged-in state 482. After the agent completes handling a call, the agent may invoke a pause request (paid) 496 to complete various ACW activities. This places the agent in the paid pause state 486. This is referred to as "paid" since the agent is engaged in work related functions and is paid for such work. Thus, even though the agent is not configured to receive calls (e.g., the agent is in pause mode or on a break), the agent is still working. When the agent completes the ACW activities, then a resume request input 495 is sent that transitions the agent back into the logged-in state 482.

Continuing with the ACW example, if the agent dwells too long in the paid pause state 486, a threshold timer 497 may trigger (i.e., expire). In one embodiment, the agent transitions to the unpaid pause state 484. This corresponds to the example illustrated in FIG. 4B. In this state, the agent is not being paid, as it is assumed that the agent is not engaged in meaningful work. If the agent initiates a resume request input 493, then the agent is returned to the logged-in state 482. At this point, the agent is ready to handle the next communication.

In another embodiment, if the agent is in the paid pause state 486 and the threshold timer 494 triggers, this will cause a transition to the logged-out state 480. This corresponds to the example illustrated in FIG. 4C. Because this state transition results in the agent being logged-out, this means that the agent cannot continue any ACW. In other words, in this embodiment, if the agent is engaged in resolving a difficult issue, then transitioning the agent to the logged out state will result in interrupting the agent as they are logged-off.

For this reason, if the result of the threshold time is to log-off the agent, the alert time may be used to warn the agent of the impending log-off action. The agent may be asked to verify via the alert message to confirm that they are engaged in appropriate ACW to reset the threshold timer. If the agent does not confirm, then the transition to the logged-out state occurs, and if they are responsive, then they return to the paid pause state 486. In another embodiment, a monitoring module tracks the user's interaction with the workstation computer to ascertain whether the agent is engaged in ACW activities. This can cause a reset of the threshold timer and prevent the agent from being logged-off as they resolve the issue.

Further, in various embodiments, various states may be defined for different types of pauses, each with different threshold timers and the potential for different treatment. For example, if the agent is late from returning from a lunch break, it may be suitable to log-off the agent upon the end of the scheduled break. However, if the agent is taking too long on ACW, it may be suitable to delay logging off the agent or confirm that the agent is engaged in ACW.

Finally, it is noted that the agent, once in the logged-in state 482, could request an unpaid pause request 491 placing the agent in the unpaid pause state 484. This may be used if the agent knows that there is a need to take a break and that it should be classified as an unpaid break. In addition, once in the logged-in state 482, the agent could initiate a log-out request 492 and transition to the logged-out state 480. This would represent an agent completing their shift.

Component Messaging

Figure 5:
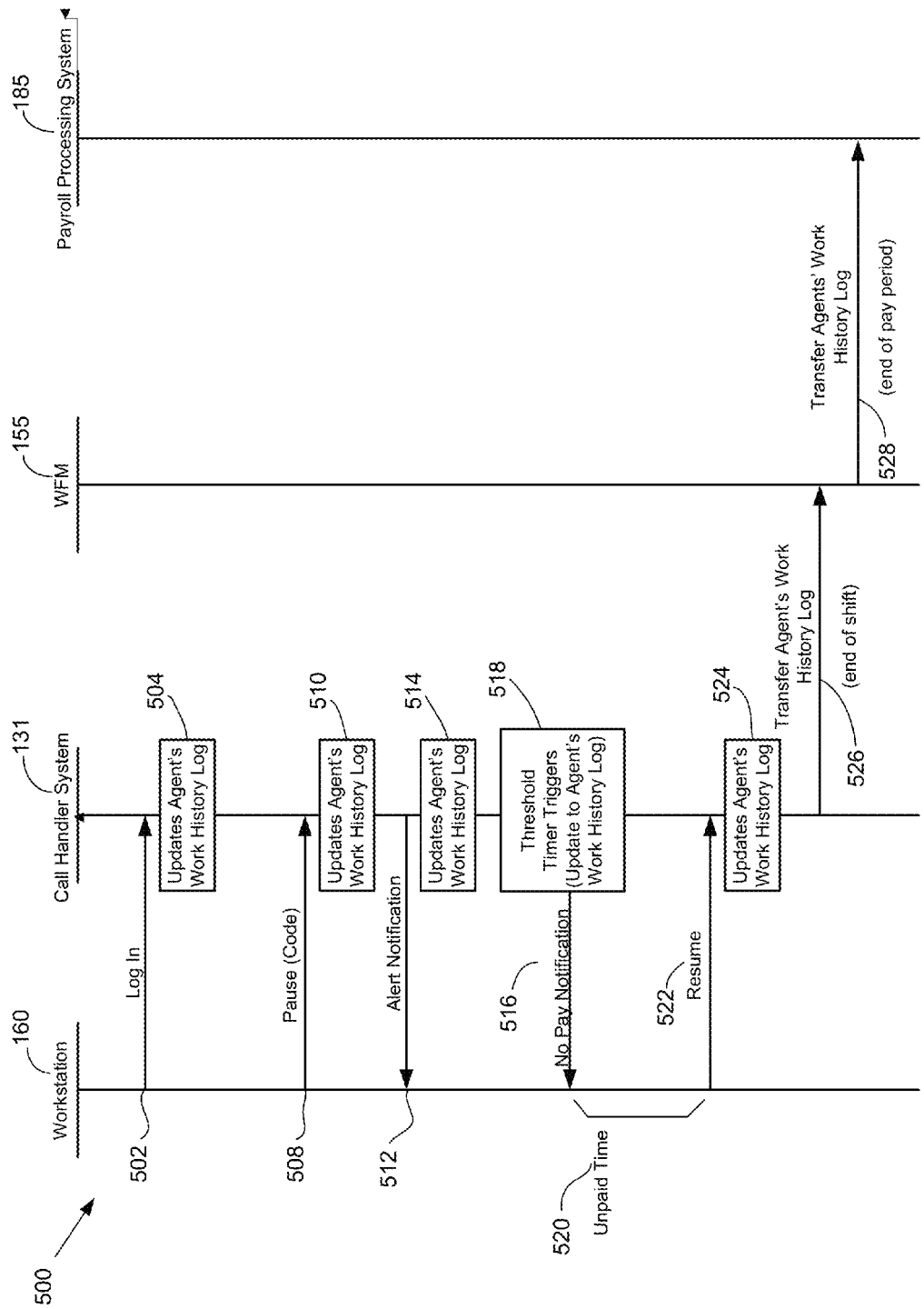
FIG. 5 shows a message flow between various contact center components related to the concepts and technologies disclosed herein in accordance with various embodiments of the present invention.

The messaging that may involve the various components shown in FIG. 1 is illustrated in FIG. 5. FIG. 5 shows a messaging diagram 500 that illustrates messaging associated with the agent workstation 160, the call hander system 131, the WFM 155, and the payroll processing system 185. The process begins with the agent at the workstation 160 logging in, which results in a log-in message 502 being sent to the call handler system 131. The call handler system 131 updates a log in operation 504 that records the times for various events associated with the agent.

At some point in time, the agent may initiate a pause along with the corresponding code indicating the type of pause. A corresponding pause and code 508 are sent from the workstation 160 to the call handler system 131. The call handler system pauses the agent, and an update to the agent's work history log occurs again in operation 510. The work history log may be maintained in the call handler system 131 as shown in FIG. 5, or it may be maintained in another component, such as the agent's workstation 160.

After some period of time, which may be defined for the specific type of pause and other factors (e.g., the campaign type, agent experience level, etc.), the call handler system 131 sends an alert notification in message 512 to the workstation. The message may be structured in various forms, and may also be sent to a supervisor, or a module maintaining current agent status information (e.g., an agent status dashboard). After the alert message is sent in operation 512, another update to the agent's work history log occurs in operation 514.

At some later time (which could be coincident with the alert notification or later), a no-pay notification in message 516 is sent to the agent by operation 518. This message may inform the agent that the break is about to transition to unpaid break time. This message may be triggered by the occurrence of $t_{threshold}$ 442 in FIG. 4B, for example. Again, an update to the agent's work history log is performed in operation 518.

At some later point in time, the agent may send a resume message 522 indicating the break is completed. The time period 520 between the no-pay notification message 516 and the resume message 522 may be considered as unpaid time. The call handler system again logs the receipt of the resume message 522 in the agent's work history log in operation 524.

At some point later, typically at the end of the agent's shift, the call handler system may update a WFM 155 using messaging 526. This allows the WFM 155 to store a copy of the agent's work history log. At a subsequent time, the WFM 155 may then transfer a plurality of agents' work history logs at the end of a pay period to a payroll processing system 185 using messaging 528 so that appropriate payroll processing may occur.

The message example of FIG. 5 corresponds to the embodiment discussed previously in FIG. 4B. Suitable modifications to FIG. 5 are possible to correspond to the embodiment discussed in FIG. 4C. Specifically, a "log-out" message could have been sent in lieu of the no-pay notification message 516. This would have logged out the agent, and the agent work history log would have recorded the agent as having been logged out. Then, when the agent resumes, a "log-in" message could have been sent in lieu of the resume message 522. The transfer of the agent's work history log to the WFM, and then to the payroll processing system could occur as indicated.

Exemplary Agent Work History Log Data Structure

The agent's work history log includes a series of events and times, which are associated with an identified agent. Typically, the agent work history log is updated whenever an event occurs such as, e.g., the agent logging on, logging out, pausing, resuming, or a timer expiring such as $t_{alert}$ or $t_{threshold}$. In one embodiment, the agent work history log is sent on a periodic basis (e.g., daily) to the WFM, and then by the WFM to the payroll processing system that then calculates the payroll for the agent based on the time worked. An embodiment of an agent work history log is shown in FIG. 6. In FIG. 6, the work history log 600 is shown as a tabular data structure comprising an agent identifier column 602, an event number column 604, an event type indicator column 606, and a time/date column 608.

Referring to the first entry, this pertains to the agent identified by Agent Identifier 0134 and identifies a log-in event that occurred at approximately 8:00 a.m. For the next entry, i.e., event number 2, a "Pause Type 3" is recorded at 9:45 a.m. As mentioned, a contact center may define the various pause types, and for purposes of illustration, it can be assumed that Pause Type 3 is a rest break. In this example, the agent resumed working in event number 3 at 10:03 a.m. Thus, the agent spent approximately 18 minutes on a break that was scheduled for only 15 minutes. Thus, this agent has already shown a propensity to take breaks longer than authorized.

Skipping over to event number 6, a "Pause Type 1" is recorded around noon, which can be assumed to be a lunch break pause that is defined in this embodiment to be 40 minutes long. At 12:47 p.m., which is 45 minutes past the start of the lunch break, an alert is recorded. This may correspond with an alert message sent to the agent indicating a "two-minute warning," for the agent to end their break, after which any further time will be considered unpaid. In particular instances, the alert may be sent to the agent's mobile device, since presumably, the agent is not at their workstation to see any messages displayed on the workstation. Thus, two minutes later, at 12:50 p.m., a threshold event is recorded as event number 8 indicating that any subsequent time is to be unpaid. Thus, when the agent resumes in event number 9 at 12:55 p.m., the agent may have incurred unpaid time from 12:50 p.m. to 12:55 p.m. In other embodiments, the agent may have been instead logged out at 12:50 as a result of the threshold timer triggering the agent to be logged out. This would have also resulted in unpaid time after the threshold timer.

The data structure for the work history log 600 shown in FIG. 6 may correspond to the embodiment shown in FIG. 4B. That is, the unpaid pause time begins with expiry of $t_{threshold}$ that occurs at some time after the issuance of the alert warning. In other embodiments, $t_{threshold}$ and $t_{alert}$ may be coincident (e.g., a time difference of zero), so that the alert warning is effectively the beginning of unpaid time.

The determination of the exact structure of the work history log of FIG. 6 may vary and reflect the type of approach used for indicating when the unpaid time begins, such as illustrated in conjunction with FIG. 4B or FIG. 4C. Returning to the example of FIG. 6, the unpaid time begins with the threshold message in event number 8 and continues until the agent resumes in event number 9. In another embodiment, a "log-off" event could have been recorded in event number 8 instead. This would require a capability in the computer workstation to automatically log-off the user. Then, when the agent resumes, a "log in" event would have been recorded in event number 9.

The approach used, and how the work history log 600 is defined, may depend on how payroll processing is performed for the agents. For instance, if the contact center controls the payroll processing system, then it may have greater flexibility in defining how the agent work history log 600 is to be processed. For example, the contract center can define that the payroll processing system construe the time between event number 8 (Threshold Alert) and event number 9 (Resume) as unpaid time.

Alternatively, the payroll processing system could define a time buffer of a certain time period after an alert occurs (e.g., two minutes) as marking the point when unpaid time begins. In this embodiment, it would not even be necessary to record $t_{threshold}$ as an event in the work history log. Specifically, the payroll processing system could be programmed to effectively process the work history log by treating it as if a threshold event was present after a set amount of time after the alert. For example, the payroll processing system could be programmed to recognize a two minute warning period after an alert indication, and treat the time after the two minutes to the end of the break as unpaid time. This embodiment requires that the agent unpaid break rules are reflected in the payroll processing system, as opposed to the agent work history log.

Thus, the functionality for recognizing unpaid break time can be shifted to various components, depending on which embodiment is preferential for a contact center.

In other embodiments, the contact center may outsource its payroll processing and may not have flexibility to define how the payroll processing system interprets the work history log 600. In such cases, the contact center may simply provide the working times for the agent to the payroll processing system. Typically, any time when the agent is logged-off is unpaid. In other words, the time between a log-on and a log-off is deemed to be time to be paid and time between a log-off and log-on is unpaid. In such instances, recording a "log-off" in response to an extended break would effectively reduce the working time to be paid.

The processing of the pause requests by a payroll system or other contact center component can be augmented in other ways to compensate for agents taking inappropriate breaks. For example, agents that are non-smokers may request smoking breaks simply to have more break time. Such agents may be prohibited from taking such breaks. Or, agents may take an excessive number of 'emergency' breaks, which are not warranted. In certain situations, it cannot be readily ascertained whether an agent requires an excessive number of emergency breaks or not. A policy may be defined that an agent may be allowed one or two of certain break types during a time period. After that, the agent is allowed or requested to take an unpaid time break. Thus, instead of logging off, the agent may be requested to take an unpaid break. This would be a new type of pause code which could be interpreted by the appropriate payroll processing system as unpaid time. In an alternate embodiment, the agent work history log could record each smoking break for an agent, and the payroll processing system could be programmed to treat the first two such breaks in a shift as paid and the remainder as unpaid.

It should be appreciated that each of the events shown in FIG. 4D, whether initiated by the agent or by a contact center component, are recorded and time stamped in the agent's work history log in various embodiments. This allows a reconstruction of what states and what events occurred during the agent's shift, so that a proper accounting of the agent's time can occur.

Process Flow

Figure 7:
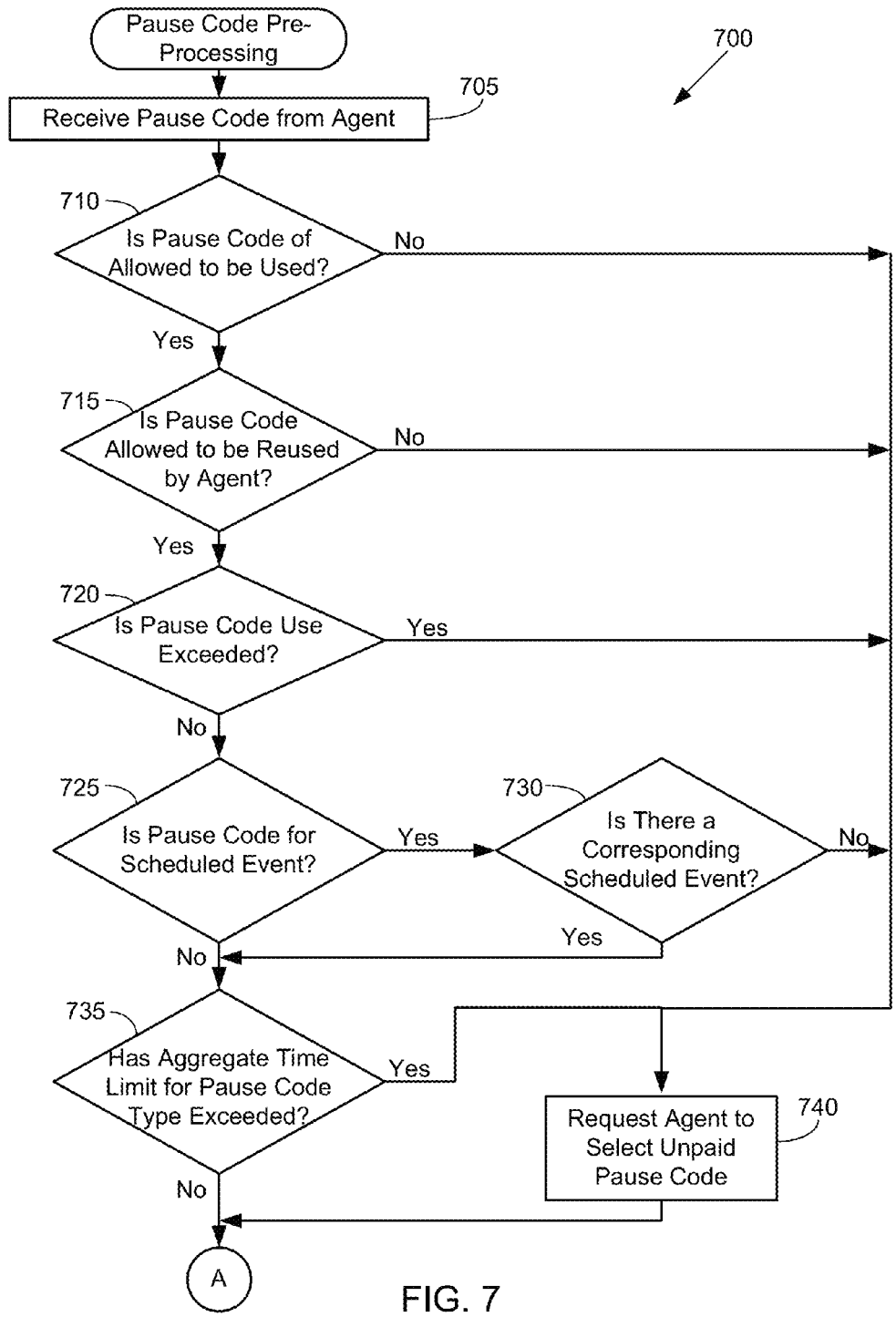
FIG. 7 shows one embodiment of a process flow for processing break requests in accordance with various embodiments of the present invention.
Figure 8:
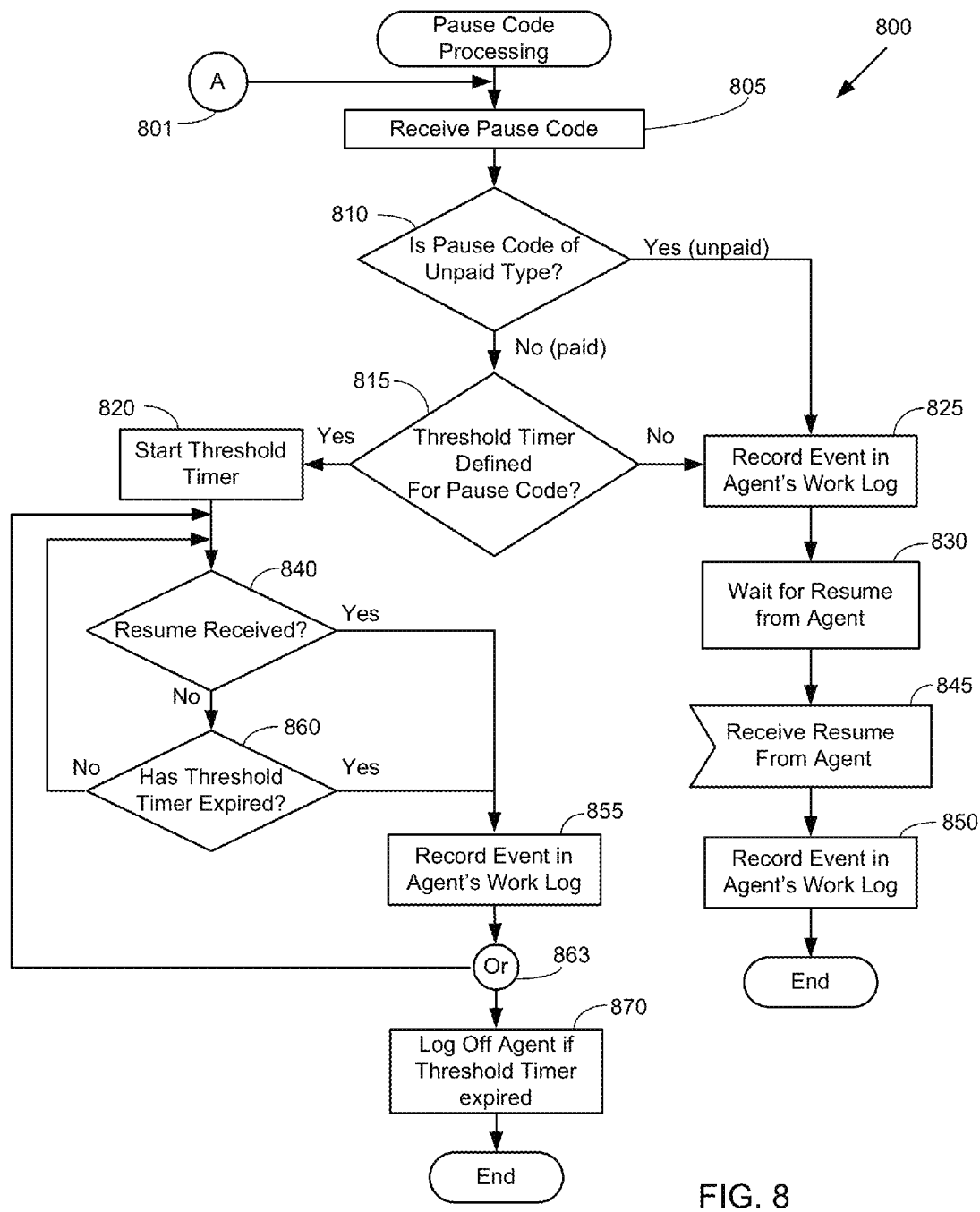
FIG. 8 shows another embodiment of a process flow for processing break requests in accordance with various embodiments of the present invention.

One embodiment of a process flow for processing pause requests from an agent is shown in FIGS. 7 and 8. There are a number of variations possible for the process flow of these figures. For example, the process flow shown in FIG. 7 may supplement the process flow of FIG. 8, or each flow could be used on a stand-alone and independent basis from the other.

Turning to FIG. 7, the process flow 700 involves processing the pause code provided by the agent using various tests to determine whether the pause code can be given its effect. The process begins in operation 705 with receiving a pause code from the agent. A test is performed in operation 710 to see whether the pause code can even be invoked by the agent. Certain pause codes may be unavailable to certain agents. For example, non-smoking agents may be restricted from invoking a smoking break. Other breaks, such as for mentoring or issue escalation, may be unavailable to junior agents. Restrictions of which pause codes can be used may be defined on a per-agent basis, a per-campaign basis, a per-agent experience level, etc.

Another test that may be performed on the pause code is shown in operation 715. This involves determining whether the agent can re-invoke the pause code. An agent may be limited as to how many times a particular pause code can be invoked during a shift, pay period, or some other time period. For example, a pause code may be defined for agent performance review. In this case, the reviews may be done periodically, every month. However, in no instance are two reviews in one month ever performed, let alone on the same day. This test may limit the agent from requesting this type of pause code within a certain time window (e.g., twice a day). Other restrictions may limit the pause code being invoked under certain conditions. For example, if contact center volumes are very high, certain breaks may be restricted.

Another test that may be performed on the pause code is shown in operation 720. This test is similar to the previous test and involves determining whether the agent has invoked the pause code too many times. The contact center policy may allow a maximum cumulative usage associated with certain type of pause codes. For example, an agent may request up to three smoking breaks a day, but not four.

Another test that may be performed on the pause code is shown in operation 725. This involves determining if the pause code is for a scheduled event. For example, if the pause code is for scheduled agent training, its use may be restricted so that it can be invoked only when there is training actually scheduled for that agent. Assuming the pause code is for a scheduled event, then a subsequent test in operation 730 may determine whether there actually is a corresponding scheduled event for the agent.

Another test that may be performed on the pause code is shown in operation 735. In this case, a test is performed to determine whether the aggregate time has been reached for previously taken breaks having the same pause code. For example, the contact center policy may allow a maximum cumulative time usage associated with certain types of pause codes. For example, an agent may receive multiple coaching sessions in a day (or some other time period), but this should not exceed sixty minutes total for a given day. Thus, three coaching breaks, each twenty minutes long, are allowable, but another coaching break may not be invoked once a cumulative time of sixty minutes has been reached.

If the pause code requested by the agent is not allowed for any of the above identified tests, or for variations thereof, then the process flow continues to operation 740 where the agent is requested to invoke an unpaid pause code. A pause code can be defined that the agent may request for a break, but the time accrued during the break does not count as paid time. This is functionally similar to logging off, but may be slightly faster and more convenient for the agent to invoke. Further, logging off does not allow for a reason to be indicated, and there may be multiple unpaid pause codes defined. This may allow the contact center operator to better diagnose the reasons for the non-paid breaks. Finally, using an unpaid pause code is likely to avoid the additional processing associated with logging-off and logging-on the agent from the call handler system.

Those skilled in the art will recognize that not all the tests shown in FIG. 7 have to be performed in all embodiments, and that other ordering of the tests is possible. Further, additional test than those shown in FIG. 7 can be defined. In this instance, the embodiment shown in FIG. 7 illustrates some of the more common tests that can occur, but no doubt more focused tests can be defined to address particular break-taking abuses by agents.

Once it is determined that the agent can invoke the pause code, then the processing shown in FIG. 8 may occur. The process 800 begins with receiving the pause code in operation 805. This pause code may have been received as an output from process 700 via input 801 or the pause code may have been received from the agent.

A first test is made in operation 810 as to whether the pause code is of the unpaid type. If "yes", then the receipt of the pause code is recorded in the agent's work history log in operation 825. The system then waits in operation 830 for the agent to send a "resume" command. Once a resume command is received in operation 845, the event is also recorded in the agent's work history log in operation 850 and the process is completed. Although not shown, the resume command would terminate the break and make the agent available for subsequent communications. In this embodiment, there are no restrictions associated with invoking an unpaid pause code.

If the pause code is not "unpaid" in operation 810 (i.e., is of a paid type), then a second test is made in operation 815 to determine whether a threshold timer is defined for that pause code. The threshold timer indicates a threshold time when the break time changes to unpaid break time. The threshold time may be distinct from the alert time. If there is no such threshold timer, then operations 825-850 are performed.

If there is a threshold timer, then in operation 820 the threshold timer is started. In operation 840 a test is performed to see if a "resume" has been received from the agent. If not, then a test is performed in operation 860 to see if the threshold timer has expired. If not, then the process loops back to operation 840 and waits for a "resume" to be sent or the threshold timer to expire in operation 860. Once the "resume" command is received, or the threshold timer expires, then the corresponding event is recorded in the agent's work history log in operation 855.

At this point, a processing option is possible at junction point 863. In one approach, the agent is logged off in operation 870 if the threshold timer expired. This corresponds to the embodiment associated with FIG. 4C. In essence, the beginning of unpaid time commences with logging off the agent. In another embodiment, the process loops back to operation 840 to wait for a resume. This corresponds to the embodiment associated with FIG. 4B. In this embodiment, the threshold timer may expire, but the agent is not logged off and the process loops back until a resume is received.

The result of the process flow of FIG. 8 is the agent work history log. The log must then be processed by a payroll processing system to determine and generate the payroll for the agent. This requires that the agent work history log be transmitted to the payroll processing system. In one embodiment, a daily agent work history log is maintained in the workstation computer used by the agent. This is transferred to a workforce management system, which collects the daily agent work history logs for other agents. This is compiled into a center wide agent work history log, and periodically (e.g., for each pay period) is transmitted to the payroll processing system. In other embodiments, the call handler system may maintain the center wide agent work history log and transmit that to the payroll processing system.

As noted, the payroll processing system can apply various rules as to how breaks are to be treated. In one embodiment, the threshold events are recorded in the agent work history log and used by the payroll processing system to treat the remainder of the break as unpaid time. In other embodiments, additional rules may be applied to indicate if and when unpaid time is to be applied in generating the contact center payroll.

Exemplary Processing Device Architecture

Figure 9:
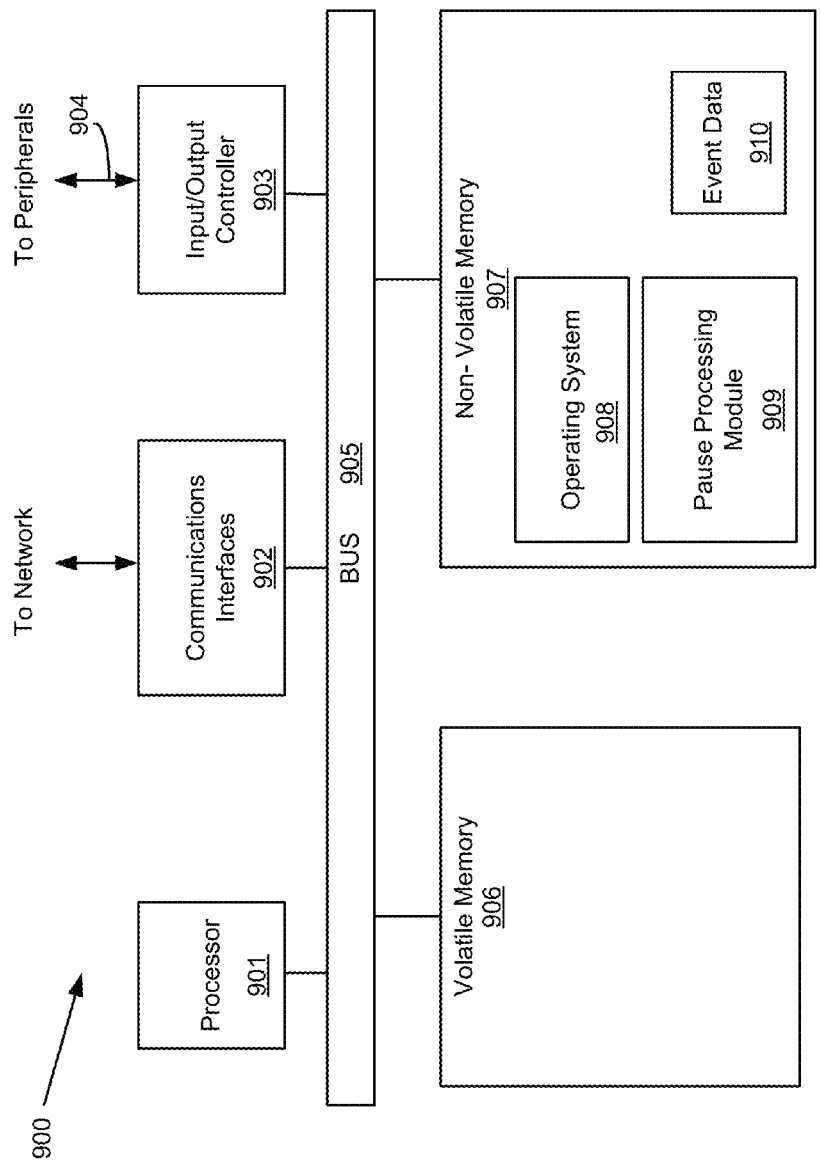
FIG. 9 discloses an architecture of a component in a contact center for practicing the concepts and technologies disclosed herein.

As discussed in conjunction with FIG. 1, the contact center architecture 100 may comprise various components that comprise a processing system. FIG. 9 is an exemplary schematic diagram of a processing system 900 that may be used in an embodiment to practice the technologies disclosed herein. Specifically, this could be implemented as a software module executing in the computer of the agent's workstation. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 9, the processing system 900 may include one or more processors 901 that may communicate with other elements within the processing system 900 via a bus 905. The processor 901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 900 may also include one or more communications interfaces 902 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 903 may also communicate with one or more input devices or peripherals using an interface 904, such as, but not limited to: a keyboard, a mouse, a touch screen/display input, microphone, pointing device, etc. The input/output controller 903 may also communicate with output devices or peripherals, such as displays, printers, speakers, headsets, banner displays, etc.

The processor 901 may be configured to execute instructions stored in volatile memory 906, non-volatile memory 907, or other forms of computer-readable storage media accessible to the processor 901. The volatile memory 906 may comprise various types of memory technologies, including, but not limited to: random access memory ("RAM"), dynamic random access memory ("DRAM"), static random access memory ("SRAM"), and other forms well known to those skilled in the art. The non-volatile memory 907 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store program code and data, which also may be loaded into the volatile memory 906 at execution time. Specifically, the non-volatile memory 407 may store one or more computer program modules, such as a pause processing module 909, and related event data 910, and/or operating system code 908 containing instructions for performing the process and/or functions associated with the technologies disclosed herein. In addition, the pause processing module 909 generate or access the event data 910 (that may include the agent work history log) in the non-volatile memory 907, as well as in the volatile memory 906. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901. These may form a part of, or may interact with, the pause processing module 909 and/or event data 910.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings.

For example, agents that take additional unauthorized break time may be paid for the entire break, but the additional unauthorized break time may be deducted from future breaks. For example, a contact center may track all the unauthorized break time for an agent during a week. Suppose this time totals to 20 minutes. When generating the agent's schedule for the following week, this time may be deducted from the agent's lunch breaks. Thus, for the following week where lunch breaks may be normally e.g., 40 minutes, the agent may be scheduled for two lunch breaks at 30 minutes, or four lunch breaks at 35 minutes. The cumulative shortening of the lunch breaks compensates for the total accumulated unauthorized time. In other embodiments, the agent's pay for the pay period could be reduced by the total unauthorized break time.

Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for an agent in a contact center to request a break during a shift of the agent, the method comprising the steps of:
   receiving a log-in from the agent at a workstation at a beginning of the shift of the agent;
   directing communications in the contact center to the workstation of the agent after receiving the log-in from the agent;
   receiving a pause request at the workstation indicating a pause code from the agent requesting the break during the shift;
   recording the pause code and a corresponding pause request time in an agent work history log;
   suspending the agent from receiving further communications from the contact center in response to receiving the pause request;
   starting a threshold timer at the beginning of the break;
   after expiry of the threshold timer, recording in the agent work history log a time when the threshold timer expires;
   receiving a resume request from the agent;
   recording a resume event time in the agent work history log; and
   terminating the break in response to receiving the resume request from the agent wherein the agent resumes receiving further communications from the contact center.

2. The method of claim 1, wherein the agent is not paid for a period of time between the time when the threshold timer expires and the resume event time.

3. The method of claim 1, further comprising:
   performing a test in response to receiving the pause request to determine if the agent is allowed to take the break based on either a cumulative break time taken during a time period or a number of breaks taken during the time period.

4. The method of claim 1 wherein the agent work history log is maintained in a workforce management system.

5. The method of claim 4, wherein the pause request and the resume request is received at a call handler in the contact center and the agent work history log is transmitted from the call handler to the workforce management system.

6. A method for an agent in a contact center to request a break during a shift of the agent, the method comprising the steps of:
   receiving a log-in from the agent at a workstation at a beginning of the shift of the agent;
   directing communications in the contact center to the workstation of the agent after receiving the log-in from the agent;
   receiving a pause request at the workstation indicating a pause code from the agent requesting the break during the shift;
   recording the pause code and a corresponding pause event time in an agent work history log;
   determining the agent has exceeded a fixed number of breaks or an aggregate amount of break time previously taken within a defined period of time;
   recording an indication in the agent work history log that the break is unpaid break time;
   suspending the agent from receiving further communications from the contact center in response to receiving the pause request;
   receiving a resume request from the agent;
   recording a resume event time in the agent work history log; and
   terminating the break in response to receiving the resume request from the agent wherein the agent can receive further communications from the contact center.

7. The method of claim 6, wherein the agent is not paid for the break.

8. The method of claim 6, wherein the pause code indicates the break is an unscheduled break.

9. The method of claim 6, further comprising:
   providing a visual notification to the agent that the break is unpaid break time.

10. The method of claim 6, further comprising the step of:
    transmitting a message to a workforce management system indicating the break is an unpaid break.

11. A non-transitory computer-readable storage medium storing instructions that when executed by a processor cause the processor to:
- receive a log-in from an agent at a workstation at a beginning of a shift of the agent;
- direct communications in a contact center to the workstation of the agent after receiving the log-in from the agent;
- receive a pause request at the workstation indicating a pause code from the agent requesting a break during the shift;
- record the pause code and a corresponding pause event time in an agent work history log;
- suspend the agent from receiving further communications from the contact center in response to receiving the pause request;
- start a threshold timer at the beginning of the break;
- after expiry of the threshold timer, record a corresponding threshold event time in the agent work history log reflecting expiration of the threshold timer;
- receive a resume request from the agent;
- record a resume event time in the agent work history log, wherein the time between the threshold event time and the resume event time is unpaid break time; and
- terminate the break in response to receiving the resume request from the agent wherein the agent can receive further communications from the contact center.

12. The non-transitory computer-readable storage medium of claim 11, wherein the instructions when executed by the processor further cause the processor to:
- start an alert timer at the beginning of the break; and
- provide a notification to the agent after expiry of the alert timer.

13. The non-transitory computer-readable storage medium of claim 11, wherein the instructions further cause the processor to:
- perform a test in response to receiving the pause request to determine if the agent is allowed to request the break associated with the pause code.

14. The non-transitory computer-readable storage medium of claim 11, wherein the instructions further cause the processor to:
- perform a test in response to receiving the pause request to determine if the agent has exceeded either a cumulative break time taken during a time period or a number of breaks taken during the time period.

15. A system for providing a break to an agent in a contact center during a shift of the agent, the system comprising:
- a call handler configured to process calls in association with the agent, the call handler configured to cease providing subsequent calls associated with the agent in response to receiving a pause request requesting initiation of the break, and further configured to resume providing calls associated with the agent in response to receiving a resume request requesting termination of the break; and
- an agent workstation comprising a processor, wherein the processor is configured to:
  - receive the pause request from the agent requesting the break during the shift, the pause request comprising a pause code;
  - provide the pause request to the call handler thereby beginning the break, wherein a corresponding pause event time is recorded in an agent work history log;
  - start a threshold timer at a beginning of the break;
  - after expiry of the threshold timer, provide an indication of the expiration of the threshold timer to the call handler, wherein a portion of the break after the expiry of the threshold timer is identified as unpaid break time;
  - receive the resume request from the agent; and
  - send the resume request to the call handler to terminate the break and to resume call processing associated with the agent in response to receiving the resume request from the agent.

16. The system of claim 15, wherein the processor in the agent workstation is further configured to:
- start an alert timer at the beginning of the break; and
- provide a visual notification to the agent after the expiry of the alert timer.

17. The system of claim 16, wherein the visual notification to the agent after the expiry of the alert timer informs the agent of commencement of the unpaid break time.

18. The system of claim 15, wherein the processor in the agent workstation is further configured to:
- perform a test in response to receiving the pause request to determine if the agent is allowed to request the break associated with the pause code.

19. The system of claim 15, further comprising:
- a workforce management system configured to store the agent work history log,
- wherein the call handler is further configured to transmit the agent work history log to the workforce management system.

20. The system of claim 19, wherein the workforce management system is configured to transmit the agent work history log to a payroll processing system.

* * * * *